(12) United States Patent
Schlunke

(10) Patent No.: US 7,556,218 B2
(45) Date of Patent: *Jul. 7, 2009

(54) AERODYNAMIC LIFTING DEVICE AND AIRBORNE CRAFT

(75) Inventor: Christopher Kim Schlunke, City Beach (AU)

(73) Assignee: Entecho Pty Ltd., City Beach, WA (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/377,098

(22) Filed: Mar. 15, 2006

(65) Prior Publication Data

US 2006/0214052 A1    Sep. 28, 2006

(30) Foreign Application Priority Data

| Mar. 15, 2005 | (AU) | ................................ 2005901244 |
| Mar. 15, 2005 | (AU) | ................................ 2005901245 |
| Mar. 15, 2005 | (AU) | ................................ 2005901246 |

(51) Int. Cl.
    *B64C 29/00* (2006.01)
(52) U.S. Cl. ................... 244/12.2; 244/23 C; 244/73 C
(58) Field of Classification Search ............... 244/12.2, 244/10, 23 C, 21, 23 D, 12.5, 7 B, 34 A, 244/73 B, 73 C, 12.1, 23 R; 415/188, 186, 415/208.3, 208.4; 180/117, 127, 128
    See application file for complete search history.

(56) References Cited

U.S. PATENT DOCUMENTS

| 2,876,965 | A |   | 3/1959  | Streib     |         |
| 3,067,967 | A | * | 12/1962 | Barr       | 244/12.2 |
| 3,103,325 | A | * | 9/1963  | Leutzinger | 244/12.1 |
| 3,107,071 | A | * | 10/1963 | Wessels    | 244/23 R |
| 3,465,989 | A | * | 9/1969  | Bowshier   | 244/23 C |
| 3,507,461 | A | * | 4/1970  | Rosta      | 244/17.23 |
| 3,519,224 | A | * | 7/1970  | Boyd et al.| 244/23 R |
| 3,632,065 | A | * | 1/1972  | Rosta      | 244/17.11 |
| 3,838,835 | A | * | 10/1974 | Kling      | 244/23 C |
| 4,208,025 | A | * | 6/1980  | Jefferson  | 244/12.2 |
| 5,524,827 | A |   | 6/1996  | Znamensky  |         |
| 5,653,404 | A |   | 8/1997  | Ploshkin   |         |

(Continued)

FOREIGN PATENT DOCUMENTS

EP        1048904        11/2000

(Continued)

OTHER PUBLICATIONS

International Search Report Related to PCT/AU2007/001718, Jan. 15, 2008, 6 pages.

*Primary Examiner*—Michael R Mansen
*Assistant Examiner*—Joshua J Michener
(74) *Attorney, Agent, or Firm*—Sheridan Ross P.C.

(57) ABSTRACT

An airborne craft is provided comprising an aerodynamic lifting device having a radial drum fan with an operating region intermediate the power loading ("y") asymptotic region and the disc loading ("x") asymptotic region of a power loading—disc loading characteristic for the lifting device. The radial drum or vertical axis fan comprises a fan with a rotor, the rotor having a rotational axis and comprising a plurality of rotor blades disposed in an annular ring about the rotational axis and a driving means for the rotor such that, on operation of the driving means, lift is generated.

10 Claims, 5 Drawing Sheets

U.S. PATENT DOCUMENTS

| | | | |
|---|---|---|---|
| 6,113,029 A * | 9/2000 | Salinas | 244/23 C |
| 6,189,332 B1 | 2/2001 | Ota et al. | |
| 6,352,219 B1 * | 3/2002 | Zelic | 244/12.1 |
| 6,368,062 B1 | 4/2002 | Yagami et al. | |
| 6,616,094 B2 * | 9/2003 | Illingworth | 244/12.1 |
| 6,669,138 B1 * | 12/2003 | Arrieta | 244/12.2 |
| 6,802,693 B2 * | 10/2004 | Reinfeld et al. | 416/1 |
| 6,843,699 B2 * | 1/2005 | Davis | 446/37 |
| 2006/0214052 A1 | 9/2006 | Schlunke | |

FOREIGN PATENT DOCUMENTS

| | | |
|---|---|---|
| FR | 2729917 | 8/1996 |
| GB | 710391 | 6/1954 |
| GB | 00881785 | 9/1961 |
| GB | 0958842 | 5/1964 |
| GB | 1361036 | 7/1974 |
| GB | 2360752 | 10/2001 |
| JP | 04-339199 | 4/1992 |
| JP | 2002-061868 | 2/2002 |
| JP | 2002-235695 | 8/2002 |

* cited by examiner

Accelerating　　　　　　　　Braking

Cornering

AERODYNAMIC LIFTING DEVICE AND AIRBORNE CRAFT

This invention relates to aerodynamic lifting devices for airborne craft.

Powered airborne craft, manned and unmanned, may be capable of hovering in a stationary position while airborne. Such aircraft may range from craft which operate close to the ground relying on a cushion of air to those capable of free flight and vertical takeoff and landing. Craft operating close to the ground may be designed for transportation and recreational use whereas the free flight craft may operate at generally low altitudes compared to commercial aircraft and may be considered for applications including airport-to-downtown shuttle, home-to-office commuting, search and rescue and surveillance operations.

The most common craft that hovers close to the ground is the hovercraft which is generally a craft used for recreational and general transport and ferry duties. This craft has a number of disadvantages that have limited its penetration of markets for motorized recreational products and general transportation of personnel and goods.

One important limitation of such craft is the inability to operate over terrain with obstacles of significant size such as waves, boulders, riverbanks and the like because close contact must be made with the ground to avoid the leakage of the air cushion. Any increase in the operating height of the hovercraft is accompanied by an unrealistic horsepower requirement. A further notable limitation is the inability to develop significant lateral thrust for acceleration, braking, climbing gradients and changing direction with realistic horsepower requirements despite the use of separate fans for developing this lateral thrust. In general, the "footprint" of the hovercraft is acceptably small for its lifting capacity because the entire area under the craft and an appropriate peripheral skirt encapsulates an air cushion which can operate at sufficient pressure with low power requirements provided that the clearance between the grounds and the skirt is small so as to minimize air leakage.

The most common and widely employed free flying vertical takeoff and landing (VTOL) craft that operates at higher altitudes is the helicopter. The success of this vehicle is due to the urgent need for this VTOL capability and the ability to achieve hovering flight with acceptable power consumption because of the very large amount of air that is contacted by the large diameter lightweight blade structure. The main undesirable characteristic of helicopters is the long rotating blades, which are a hazard to personnel and to the aircraft itself should they strike anything in the area and the very large footprint or minimum safe space requirements that these aircraft require, particularly during takeoff and landing.

Further undesirable characteristics include the requirement for a remotely mounted propeller to counteract torque reaction of the airframe to the drive of the main rotor, complicated and relatively fragile rotor blade attack-angle controls, high maintenance requirements and rotor blades which must be long, thin, and relatively light and thus are flexible and subject to fatigue problems. Add to this incomplete list of limitations the fact that failure of any one of these components is likely to have catastrophic consequences for the aircraft and all on board and it is evident that an alternative design is desirable.

In a craft free of ground effect, lift can be generated by the acceleration of a mass of air by a fan, propeller, wing, or other system. When a mass of air is changed from rest to a given velocity in a downward direction, an upwardly directed reaction force is produced. In general, the more air that is directed, the less power is required to produce a given lift. This defines the technical challenge which this invention attempts to address because increasing the volume of air generally involves an increase in the size of the craft as evidenced in the large diameter, high speed blades used in helicopters.

The rotor blades of a helicopter develop lift by accelerating air downward and parallel to the axis of its rotation (axially). The velocity of the tip of the rotor blade is typically set to a maximum that is close to sonic conditions on the advancing blade when the helicopter is at maximum forward speed. The remainder of the blade must operate at a lower velocity proportional to its distance from the axis of the rotor. Unfortunately this non-uniform velocity along the blade means that significant blade length is underutilized despite varying the angle of attack and changing the aerodynamic profile along the length of the rotor blade because lift is proportional to the velocity squared. To compound the problems of the rotor, because the highest lift is generated at the highest velocity region, at the tip a very high bending moments is generated on this cantilevered structure. Further, to get the maximum lift from the rotor, the blade tip must operate at the highest permissible velocity close to sonic conditions, which means that considerable noise is generated. Correspondingly the rotor diameter cannot be reduced because to generate the same lift, the velocity would have to increase beyond sonic conditions or some part of the operating envelope would have to be compromised.

Further, and within the class of airborne hovering craft capable of free flight, it would be a desirable object to achieve an increase in payload or lift at the same or reduced power in order to improve fuel efficiency and operating cost.

It is a further object of this invention to provide an aerodynamic lifting device for airborne craft such that such craft deliver performance characteristics superior to helicopters by generating superior lift capability and/or a reduced horsepower requirement from a lifting device with a smaller footprint.

It is a still further object of this invention that the fan geometry and power train used to achieve operation provide a convenient, stable and safe load space for manned and unmanned operation.

With these objects in view, the present invention provides, in one aspect, an aerodynamic lifting device comprising a fan with a rotor, the rotor having a rotational axis and comprising a plurality of rotor blades disposed in an annular ring about the rotational axis and a driving means for the rotor such that, on operation of the driving means, lift is generated. Such an aerodynamic lifting device may be used in airborne craft, particularly hovering craft, whether manned or unmanned.

Preferably, the blades have a longitudinal extent parallel to the rotor axis and the flow through them is primarily radial or perpendicular to the rotor axis. In this way substantially the entire length of the blade is operating at a similar velocity and generating the maximum amount of momentum in the air for minimum blade mass and minimum vehicle overall size. By avoiding the radially disposed blades, the optimum blade velocity and blade geometry can be utilized, and the size, cost and weight of the structure can be minimized. Further, the blades can be restrained at each end (i.e. at the upper and lower ends) by a circular ring restraining endplate that minimizes the bending moment on the blade generated by the aerodynamic loads. This allows for a lighter blade structure, lighter vehicle structure and ultimately for the reasons noted above a reduced vehicle size.

Such a design allows achievement of a design envelope for airborne aircraft, specifically hovering aircraft, that—when considered according to a power loading—disc loading characteristic as commonly used in the field of helicopter design—is constrained on one axis by lift horsepower characteristics that are similar or slightly superior to helicopters and on another axis by disc loading or weight/unit area of the vehicle footprint that is on the order of 2 to 3 times larger than typical helicopters and while advantageously using the radial fan or aerodynamic lifting device of the present invention. Such a lifting power—disc loading characteristic mathematically asymptotes to infinite power loading at low disc loading (y—asymptote and defining a y asymptotic region where helicopters currently operate) and infinite disc loading at low power loading (x asymptote and defining an x asymptotic region) though there are practical constraints on power loadings and disc loadings achievable in practice. The aerodynamic lifting device of the invention allows operation of a hovering craft in a region which may be described as an intermediate region (between the x and y asymptotic regions) of a momentum characteristic for a fan lifting device or on or above the momentum equation in contrast to current airborne craft, notably helicopters. The fan may be described as a radial drum fan which may be defined as a fan of which the blades have a radial depth that is less than 25% of the radial pitch of the blades.

Preferably, the device includes a stator that has blades that are upstream or downstream of the rotor blades and which produce an equal but opposite torque to the rotor. Reference to "stator" and "stator blades" will be understood to be a reference to a stationary components of the device relative to the rotating fan.

An upper face of the inner and outer hub or stator of the fan which are disposed near the inlet or low pressure side of the fan can be contoured to function as wings and produce significant lift by developing high velocities and lower pressures near these surfaces. An annular airfoil or airfoils may be deployed as a device to improve lift while the craft is hovering while also functioning as a flow deflector to improve the radial flow into the stator and fan assembly. Desirably this annular airfoil can also function as the upper restraining ring for the stator blades.

This radial flow is desirably converted to pressure in a suitably shaped duct formed beneath an outer hub thereby maximizing the lift generated by the process. The increase in pressure which occurs through the blades of the fan as a result of the acceleration of the airflow by the blades can be optimized by the design of the radial duct that exists downstream of the fan. It is an aspect of this invention that this duct directs the flow downward and optimizes the pressure field developed downstream of the fan to generate the maximum lift.

The change in area of this duct in the direction of the airflow increases by no more than 1.5 times from inlet to exit and decreases by no less than 0.5 times from inlet to exit. It is also an aspect of this invention that the mean flow path length of this radial annular flow path can vary from the minimum possible length that deflects the air through 70 degrees to 110 degrees up to 3 times this length. It is also an aspect of this invention that this duct is constructed from a flexible material that deflects the flow to provide a compact lightweight means for directional control of the craft. This is to be contrasted to the skirt of a conventional hovercraft which simply maintains a close contact with the ground rather than providing a means to deflect the airflow to provide thrust and directional control of the craft.

A further means of producing lift when close to the ground, effective in takeoff and landing, is "Ground Effect." This is roughly equivalent to creating a zone of very slight compression in the air between the vehicle and the ground and using that pressure applied to the lower projected area of the vehicle to help support said vehicle. This effect becomes stronger as the ground is approached and becomes negligible as the vehicle lifts away from the ground. It is an aspect of this invention that this ground effect is also utilised in combination with the other lifting aspects by deploying said flexible flow deflecting duct at a distance which is sufficiently close to the ground to generate significant additional lift when it may be required for take-off or very high payloads. In this case the flexible flow deflecting duct effectively acts in a similar capacity as the skirt of a hovercraft.

In a further embodiment of this invention, there is provided an airborne lifting device comprising:

a vertical axis fan with a plurality of blades whose axes are also vertical or near vertical disposed at a distance from said axis, having a chord or radial depth which is small relative to said distance and generating primarily radial airflow;

a stator assembly that comprises an inner load carrying hub and lifting surfaces, stator blades that are radially inward of and parallel to said fan blades;

an upper stator blade retainer that may incorporate lifting surfaces; and an outer shroud that incorporates upper and lower aerodynamic lifting surfaces. The shroud acts as a thrust vector which enables a variety of maneuvers for an airborne craft employing the airborne lifting device.

Preferably, the fan comprises vertical or near vertical blades which may have uniform section, may include an upper retaining ring for said blades and a lower retaining ring, said rings forming a diffuser duct in conjunction with said shroud for the purposes of generating the maximum pressure over the largest horizontally projected area of the lower lifting face of the shroud for generating: a lifting force. The shroud may be flexible or be of varying flexibility in selected directions or regions and may be constrained at its inner and/or outer periphery. Shroud constraints may be moved by an operator or controller as a thrust vector to effect directional control of a craft employing the lifting device. In this way, other means to achieve directional control may be omitted.

The fan may be driven via said lower retaining ring using a friction drive, belt, gear or other drive, such drive being provided by a source of power disposed near the said retaining ring or radially further inboard toward the centre of said load carrying hub.

The stator may be mounted inboard of the rotor and so as to provide a support for the payload. Aerodynamic device(s) or surfaces providing lift may be mounted on the input airflow side of the rotor and may form part of a retaining ring which supports the blades of the stator. An inner hub of the stator may incorporate an upper payload carrying and lifting surface and may have a load space beneath it. Radial dimensions of said inner hub, stator blades, fan blades and outer shroud are advantageously minimized to generate the smallest possible footprint while still creating sufficient lifting surface area and sufficient airflow at a low enough pressure to minimize the power required for lift.

In contrast to the practice of using axial flow fans (as in helicopters) for generating lift, there is provided a radial flow fan lifting device in which blades of limited radial dimensions are adopted to create a static load carrying space in the centre of the craft such that craft overall dimensions are minimized for a given lifting capacity. Further, the rotor blades are thereby positioned in a fixed radial location so that the total length of all the blades in the rotor assembly operate at a similar and optimized velocity to accelerate the largest amount of air over suitably disposed adjacent lifting surfaces thereby minimizing the horsepower required to generate lift within a small vehicle envelope. Further, the fan geometry provides operation of airborne craft with competitive lift/power performance with a much reduced footprint or weight/area ratio when compared to current craft. At the same time, the fan geometry provides a convenient central stable safe load space for manned and unmanned operation.

A manned airborne craft having the above described lifting device preferably comprises an operator area for housing an operator and operator controls for maneuvering the airborne craft. The operator area may be disposed such that, in operation, the centre of gravity of the operator is at or below the upper most extremity of the rotor blades and further located such that the operator has a clear line of sight horizontally across the top of the fan.

This positioning of the operator provides a number of benefits. The center of gravity of the craft is at least 0.3 times the craft diameter, and below the intersection of the line of action of the lifting forces when the craft is tilted at an angle of 45 degrees. Firstly, the operator is located in a safe position within the craft structure because the significant energy must be expended in the event of an impact by deforming the shroud rotor, stator and inner hub before there is any intrusion into the operator's cockpit.

The driving means for the rotor is desirably such that the inside of said rotor is not occupied by rotating components that would intrude into the free load space thereby made available. The driving means may include a friction or belt drive, a gear drive, a chain drive or an inductive or magnetic drive. A belt drive may incorporate a belt which has teeth on the outer side which engage in a driving pulley mounted on an engine or motor, an idler pulley that changes the direction of the belt so as to create sufficient wrap angle on said driving pulley, and a flat side on said belt that drives an outer rim of an annular flange that is connected to said rotor blades.

A particular advantage of the aerodynamic lifting device and airborne craft of the present invention is the lesser noise compared to helicopters and other similar craft.

The invention may be more fully understood from the following description of preferred embodiments thereof made with reference to the accompanying drawings in which:

FIG. 1 is a graph of power loading vs disc loading which indicates the calculated lift performance and power requirements of a range of helicopters and an aerodynamic lifting device according to the invention. A curve, which indicates the performance indicated by the momentum equation, is also shown along with a similar curve that predicts the performance of a helicopter that is just capable of hovering with no additional horsepower available for climbing or for operation at higher altitudes.

Figure 7:
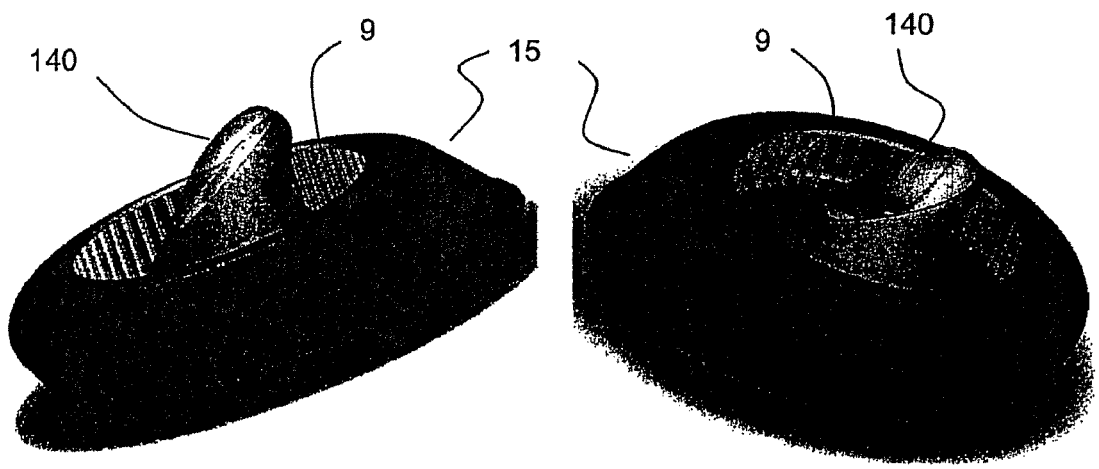
Figure 7:
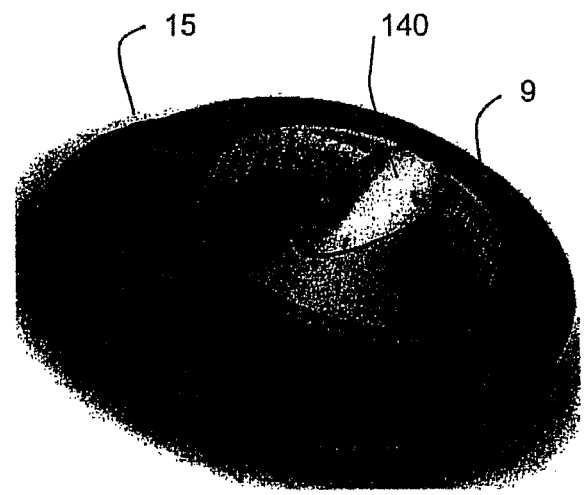

FIG. 7 provides images of the flexible shroud thrust vector in various positions.

Figure 1:
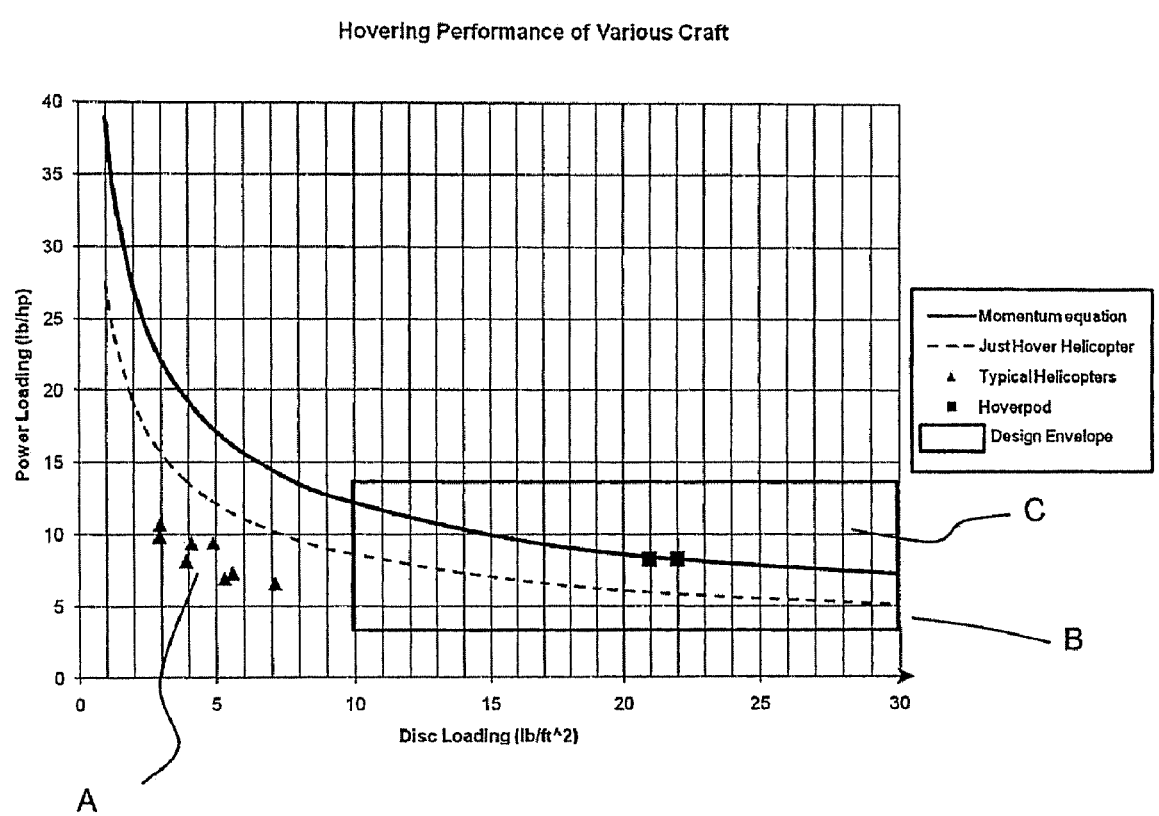

Referring to FIG. 1 there is shown a power loading ("y")—disc loading ("x") characteristic conventionally used in the field of helicopter design and showing operating points for helicopters using long rotating blades in accordance with current practice. These points assist in defining an operating region for current hovering craft which corresponds to a region in which power loading asymptotes and which may be described as the power loading or y asymptotic region "A". Intermediate this region and the disc loading or x asymptotic region "B" lies an intermediate region "C" forming the design envelope for airborne hovering craft forming one aspect of this invention. The intermediate region "C" may also be defined, by way of more specific example, as an operating region in which an aerodynamic lifting device or airborne craft (referred to as a "Hoverpod" aircraft) has a band of disc loadings or weight per unit of lift area from 10 to 30 lb/sq ft as shown on the horizontal, or "X" axis, while also operating within the band of power loading or weight per unit horsepower from 3 to 13 lb/hp as shown on the vertical, or "Y", axis. This mix of characteristics is developed as a result of the radially compact design described with reference to FIG. 4. Such combination of characteristics allows for the lowest horsepower, the smallest size or the maximum useful payload or a desirable combination of any or all of these.

Figure 2:
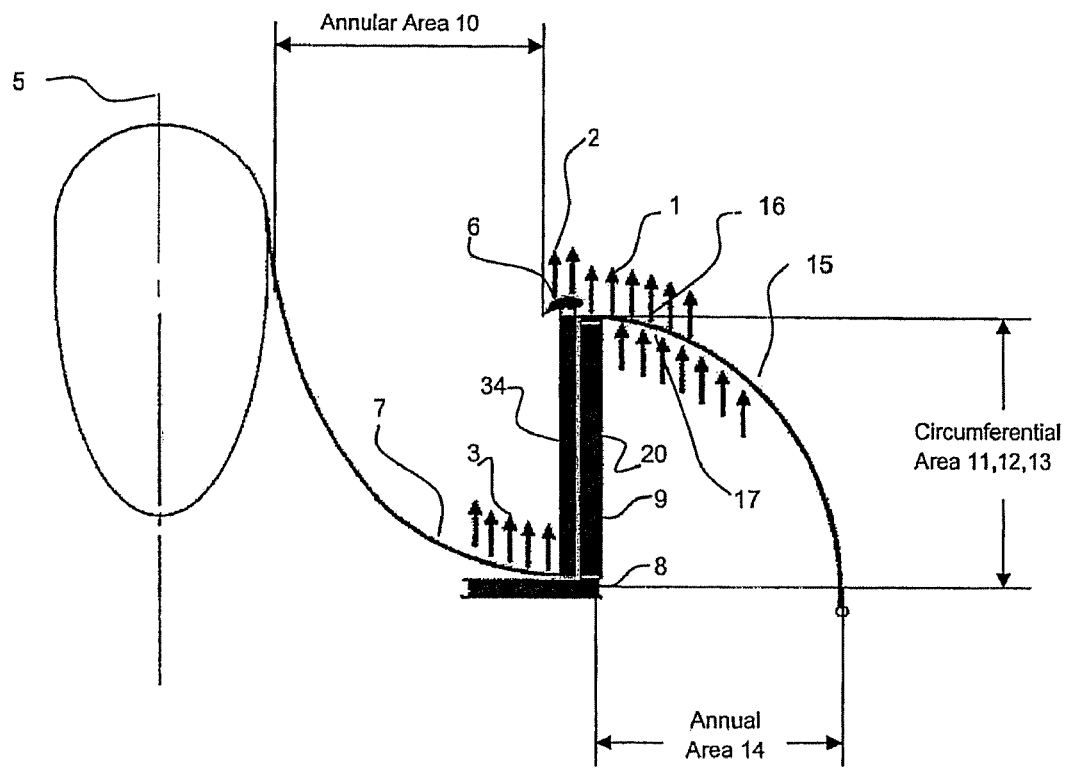
FIG. 2 is a diagrammatic half sectional view of an embodiment of the invention that indicates the primary lifting surfaces of the aerodynamic lifting device of the invention.

Referring to FIG. 2, there is shown a diagrammatic representation of the lifting device for an airborne hovering craft to operate within the design envelope or intermediate region "C" of the power loading—disc loading characteristic. Lift generated by the low pressure on the upper surfaces shown at 1, 2, and 3 may be optimized by optimizing the shape of these surfaces. The geometry of the shroud may also be optimized, particularly in the region of surface 1 and surface 14 (i.e. the annular area at the exit of the shroud 15). For example, an air foil shape may be adopted for surfaces 1 and 3. A flow guide, 6, which may be a separate annular ring with an aerodynamic cross section that may also function as a retainer and end plate for the stator blades is also desirably incorporated. Flow guide 6 may have a shape optimized to generate maximum lift through the development of the maximum pressure difference between its upper and lower surfaces. Flow guides similar to flow guide 6, placed above and attached to surface, 7, and to surface 8, which is part of the lower end plate of the rotor, 9 can also be provided. Optimum duct dimensions are selected, as desired, for the annular inlet area, 10, the vertical cylindrical areas, 11, 12 and 13, defined by the stator vane height at inlet, the rotor vane height at inlet, and the rotor vane height at exit respectively and the annular exit area, 14.

Figure 3:
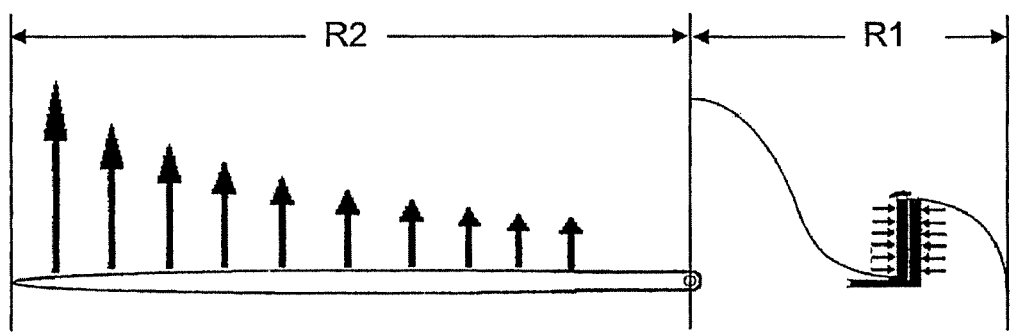
FIG. 3 is a diagrammatic half sectional view of the aerodynamic lifting device compared to a rotor blade lifting mechanism used by a helicopter scaled to demonstrate the size benefits of this invention.

Referring to FIG. 3, there is shown a diagrammatic representation of the lifting surfaces of FIG. 2, and the lifting surfaces of a helicopter rotor blade with comparable lifting capability. It can be seen that the radial dimension R1 for the aerodynamic lifting device of the invention is significantly less than the radial dimension R2, which is the radius of the rotor disk of the helicopter.

Figure 4:
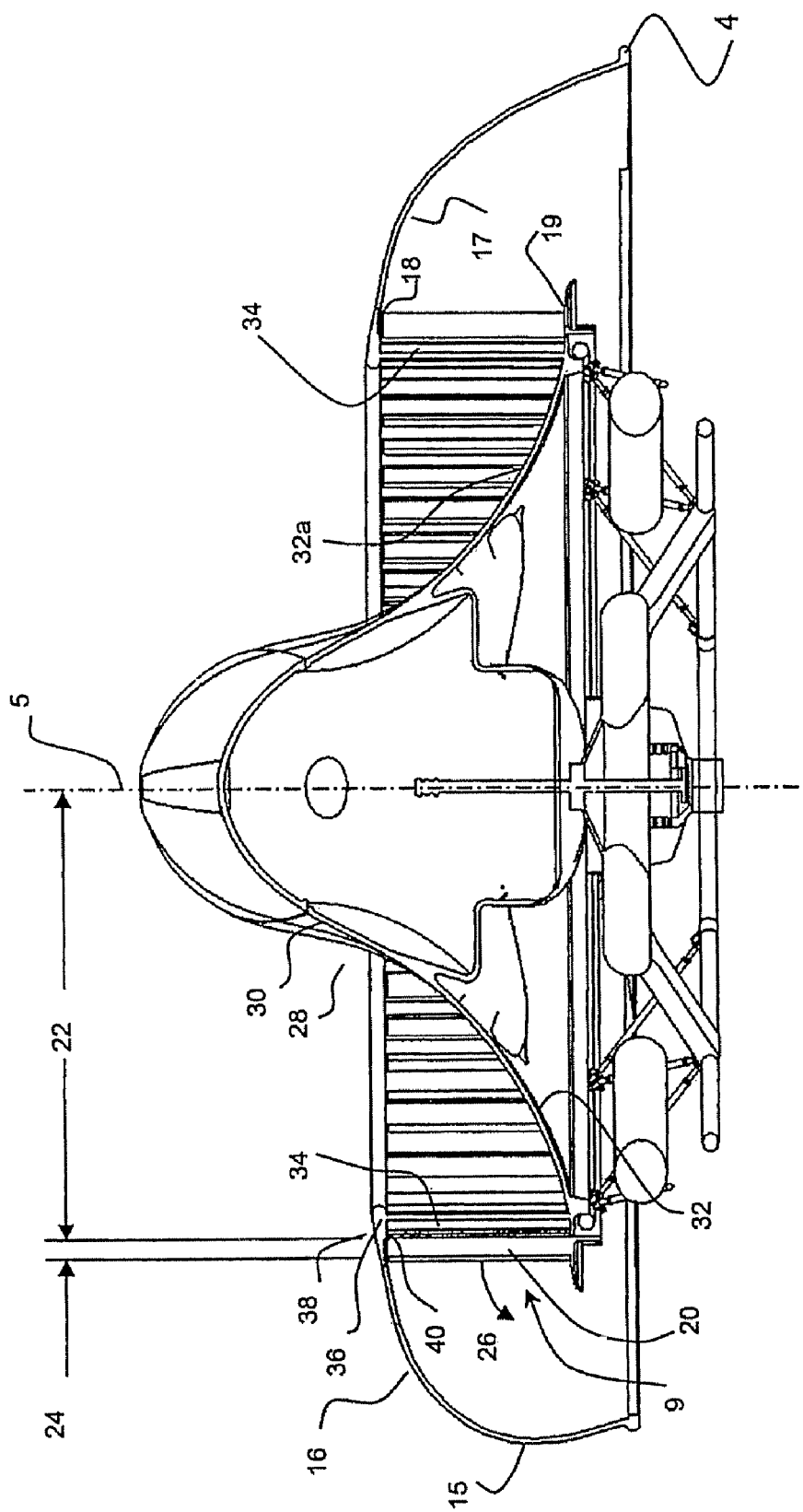
FIG. 4 is a sectional view of a preferred embodiment of the invention that indicates the primary lifting surfaces of the aerodynamic lifting device of the invention.

Referring to FIG. 4, there is shown a rotor in the form of a radial drum fan 9, with a plurality of vertically extending blades 20, arranged in an annulus disposed at a distance 22, from the fan axis 5, said blades having a radial width 24, which is small relative to radial distance 22. The blades 20 extend downward and parallel to the fan axis 5. This construction thereby creates a useful load space inside the fan 9 and minimizes the mass of the fan 9 to provide the maximum useful load weight, and to avoid excessive gyroscopic and accelerating and decelerating forces on the rotor. This construction also allows the inlet area to the fan 9 to be maximized thereby minimizing the velocity that needs to be induced in the incoming air to generate the desired amount of lift.

Fan 9 generates a primarily radial airflow 26 which does not impart any axial momentum to the air to generate lift through the rotor in contradistinction to the case with helicopters. Such construction allows the complete axial length of the rotor blades to be utilized to develop said velocity and therefore to develop maximum pressure beyond the fan exit. This means that maximum use is made of the fan blade length and mass in contrast to the inefficient use made of conventional helicopter blades of the prior art.

A stator assembly 28, comprises an inner load carrying hub 30, with lifting surfaces 32 and 32a, a plurality of stator blades 34, and an upper stator blade retaining ring 36, with upper and lower lifting surfaces 38 and 40, and an outer shroud 15, that incorporates upper (i.e. outer) and lower (i.e. inner) lifting surfaces 16 and 17. The stator blades 34 of the stator assembly 28 provides an equal and opposite torque to the rotor.

Fan blades 20 have a uniform section, and may be retained by an upper rotor blade retaining ring, 18, and a lower rotor blade retaining ring, 19. Rings 18 and 19 form a diffuser duct in conjunction with shroud 15 for the purposes of generating the maximum pressure over the lifting surface 17.

Lower blade retaining ring 19 has an outer friction or drive face that can be driven by the back of a toothed belt, a flat belt, or other drive means.

Figure 5:
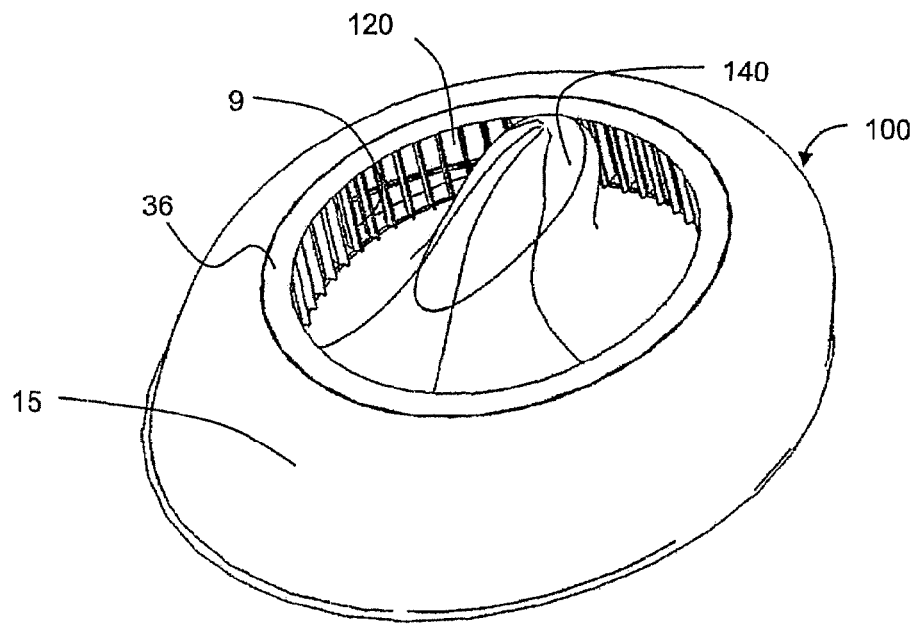
FIG. 5 is a schematic drawing of a preferred embodiment of this invention.

Referring to FIG. 5 there is shown an airborne craft 100 of a preferred embodiment of the invention, which can be used in a wide variety of applications. FIG. 5 indicates the use of a shape for the central load carrying space 120 that provides a cockpit operating area 140 for an operator while maximizing the area available for airflow into the fan 9. In particular, the horizontal annular area defined by the cockpit 140 and the upper annular retaining ring for the stator 36 (annular are 10 in FIG. 2) that could control the air entry to the fan is held to the maximum and the volume available for the operator is allowed to grow vertically and radially above this plane to provide more load space without compromising airflow into the fan. The flexible shroud 15 is shown in a forward deflected position as may be used to effect a braking or reversing maneuver.

Figure 6:
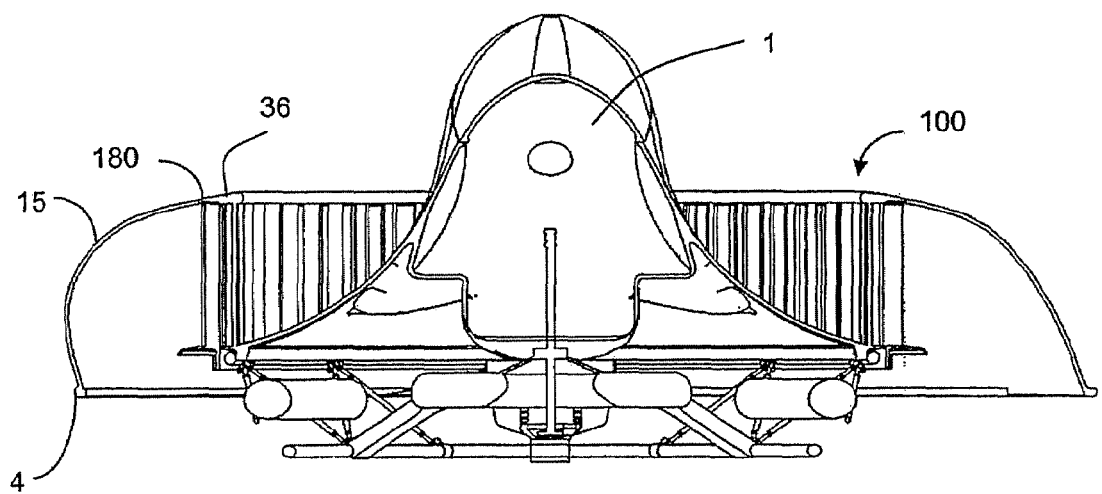
FIG. 6 is a similar sectional view of said preferred embodiment that shows the flexible shroud or thrust vector in an offset position with the lower rigid ring displaced to effect a change in direction.

Referring to FIG. 6, there is shown an outer shroud 15 for airborne craft 100 which incorporates an inner edge 180 that is fixed to a grill and/or vane sub assembly attached to the stator blade retaining ring 36; the outer shroud 15 forming a relatively flexible flow guide; and having a relatively rigid outer rim, 4, and means (not shown) for connecting said rigid outer rim to a means for an operator to control the position of the said outer rim relative to the said fixed inner edge such that the flow guide and outer rim create a smooth surface that vectors the airflow in a desirable way to assist with maneuvering of the airborne craft 100.

Referring to FIG. 7, there is shown a preferred embodiment of airborne craft 100 that shows the flexible shroud 15 in three positions, as achieved by control of airflow so as to cause the airborne craft 100 to accelerate forward, brake or reverse backward, or move laterally as would be required to go around a corner.

Modifications and variations of the aerodynamic or airborne lifting device and airborne craft of the invention may be apparent to skilled readers of this disclosure. Such modifications and variations are deemed within the scope of the present invention.

The claims defining the invention are as follows:

1. A lifting device comprising:
   a radial drum fan with a plurality of fan blades, whose axes are generally vertical, disposed at a distance from an axis of said radial drum fan, said plurality of fan blades having a radial depth which is less than said distance and generating primarily radial airflow;
   a stator assembly that comprises an inner load carrying hub and lifting surfaces, stator blades that are radially inward of and parallel to said plurality of fan blades;
   an upper stator blade retainer that incorporates lifting surfaces; and a thrust vectoring means for directional control of the device.

2. The device of claim 1 wherein said radial drum fan comprises a rotor that is driven on its periphery by a ring.

3. The device of claim 2 wherein said rotor is driven on its periphery by a friction drive.

4. The device of claim 1 wherein a chord depth of said plurality of fan blades is less than said distance from said axis.

5. The device of claim 1 wherein said radial drum fan has an input airflow side and at least one wing to generate lift mounted on said input airflow side.

6. The device of claim 1 wherein said thrust vectoring means deflects airflow from the radial drum fan in a downward direction and is in the form of a shroud.

7. The device of claim 6 wherein said thrust vectoring means is a flexible shroud.

8. The device of claim 6 wherein said shroud is of varying flexibility, having flexible and rigid portions.

9. The device of claim 6 wherein said shroud incorporates upper and lower aerodynamic lifting surfaces.

10. The device of claim 6 wherein said shroud has a circumference disposed outwardly from said radial drum fan.

\* \* \* \* \*